(12) United States Patent
Sevaston

(10) Patent No.: US 6,254,036 B1
(45) Date of Patent: Jul. 3, 2001

(54) METHOD AND APPARATUS FOR SPACECRAFT WHEEL DESATURATION

(75) Inventor: George E. Sevaston, Hermosa Beach, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/505,412

(22) Filed: Feb. 16, 2000

(51) Int. Cl.$^7$ ....................................................... B64G 1/28
(52) U.S. Cl. ............................ 244/165; 244/164; 244/166
(58) Field of Search ............................... 244/158 R, 164, 244/165, 166, 171

(56) References Cited

U.S. PATENT DOCUMENTS

| | | | |
|---|---|---|---|
| 4,010,921 | * | 3/1977 | Pistiner et al. ..................... 244/166 |
| 5,123,617 | * | 6/1992 | Linder et al. ....................... 244/166 |
| 5,248,118 | * | 9/1993 | Cohen et al. ....................... 244/164 |
| 5,343,398 | * | 8/1994 | Goodzeit et al. ................... 364/434 |
| 5,608,634 | * | 3/1997 | Goodzeit et al. ............. 364/424.013 |
| 5,765,780 | * | 6/1998 | Barskey et al. .................... 244/165 |
| 5,787,368 | * | 7/1998 | Gamble et al. ....................... 701/13 |

\* cited by examiner

Primary Examiner—Peter M. Poon
Assistant Examiner—Kevin Jakel
(74) Attorney, Agent, or Firm—T. Gudmestad

(57) ABSTRACT

A method and apparatus are provided that effect spacecraft wheel desaturation by controlling the magnetic torquers aboard the spacecraft. An attitude control system energizes a magnetic torquer coil or set of magnetic torquer coils using a power source having an initial polarity and then monitors the spacecraft's response to the torque created by the coil's magnetic field. By measuring the spacecraft's response to the torque created by the energized magnetic torquers, the direction of the earth's magnetic field is determined. Once the direction of the earth's magnetic field is known, the proper polarity may be applied to the coil to achieve the desired torque. The control system of the present invention synchronously demodulates the craft's angular velocity, estimated from signals obtained from the attitude sensors, using a small dither signal that is superimposed on the control current used to energize the magnetic torquer coil. The result of the synchronous demodulation yields information as to the direction of the earth's field which is then used to control the polarity of the coil energizing power source. Thus, the magnetic torquers are used to achieve a torque that opposes the torque created by the reaction wheels to effect wheel desaturation without the need for the complex and weight-intensive magnetic field measuring and estimating equipment used in conventional attitude control systems.

25 Claims, 6 Drawing Sheets

METHOD AND APPARATUS FOR SPACECRAFT WHEEL DESATURATION

BACKGROUND OF THE INVENTION

1. Field of the Invention

The present invention relates generally to satellite attitude control and more particularly to a method and apparatus for using magnetic torquers to perform reaction wheel desaturation without the need for magnetometers or magnetic field models.

2. Description of Related Art

Spacecraft attitude control is required to maintain proper orientation of the spacecraft relative to earth. To maintain a desired position, the attitude control system must account for the earth's movement and counteract both internal and external disturbances that cause undesired attitudinal movement of the craft.

The use of reaction or momentum wheels to effect precision attitude control is well known in the art. The reaction wheels are positioned within and rotate independently of the spacecraft. This rotation causes a torque to act on the inertial mass of the spacecraft, thereby inducing a radial acceleration that causes attitudinal movement of the craft. In this way the torque created by the reaction wheels is used to effect attitude control.

Reaction wheels are especially effective at offsetting internal disturbances that are typically periodic in nature and are due to mechanical device movement or vibration onboard the spacecraft. However, reaction wheels acting alone are not sufficient to counteract the external disturbance torques that are typically non-periodic in nature and result from phenomenon such as nearby space debris, passing comets, etc. To offset the effect of these disturbances, magnetic torquers are often employed to limit the speed at which the reaction wheels rotate, an operation that is referred to in the art as wheel desaturation. By creating a torque that opposes the wheel torque, the magnetic torquers cause a decrease in the wheel speed. In the simplest form, the torquers are solenoids that are energized to cause current flow therein. When energized, a magnetic field is induced having an intensity, $\vec{H}$, given by the following expression:

$$\vec{H} = \frac{n \cdot i}{L} \cdot \vec{a}_H$$

where

L is the length of the current path, n is the number of turns in the solenoid, i is the current; and $\vec{a}_H$ represents a unit vector having a direction that is perpendicular to the direction of the current flow within the solenoid.

This resulting magnetic field seeks to align itself with the earth's magnetic field causing a torque to act on the body of the craft. Since the direction of the induced magnetic field, $\vec{H}$, is perpendicular to the direction of the current flow, the polarity of the power source applied to the coil determines the direction of the induced field. Once the direction and strength of the earth's magnetic field is known, a power source of proper polarity applied to the solenoid induces a magnetic field that produces the desired torque. Thus, the key to creating a desired torque is determining the characteristics of the earth's magnetic field with respect to the position of the craft.

Conventional systems use magnetometers or magnetic field models to determine the earth's magnetic field with respect to the spacecraft. However, determination of the earth's field using magnetometers involves measurement of the earth's field requiring a full complement of weight-intensive magnetic field sensors. Magnetic field models that allow estimation of the earth's magnetic field given the position of the craft with respect to the earth and sun are also disadvantageous because the estimation performed with the magnetic field model requires complex circuitry that increases the complexity of the spacecraft design. The added weight and design complexity inherent in using either magnetometers or magnetic field models increase the cost and energy consumption of the spacecraft. Therefore, it is desirable to have a method and apparatus for performing magnetic torquer control without the additional weight, cost, power consumption and operational complexity ordinarily associated with magnetometers and/or magnetic field models.

SUMMARY OF THE INVENTION

The present invention provides an attitude control method and apparatus that uses magnetic torquers to perform reaction wheel desaturation without the need for magnetometers or magnetic field models.

In accordance with one aspect of the present invention an apparatus is provided for use in connection with controlling the attitude of a spacecraft. The apparatus includes at least one magnetic torquer that, when energized, creates a torque that acts upon the spacecraft, and at least one sensor that monitors at least one spacecraft variable and generates sensor signals containing information about the spacecraft variable. In addition, a control device applies a test signal to the magnetic torquer, evaluates the sensor signals to determine the impact of the test signal, and controls the operation of the magnetic torquer based on the evaluation of the sensor signals.

According to another aspect of the invention, a spacecraft having attitude sensors that generate sensor measurements related to the attitude of the spacecraft, reaction wheels that control the attitude of the spacecraft and magnetic torquers that affect the speed of said reaction wheels are managed via a control device. The control device applies a test signal to the magnetic torquer, and uses at least some of the sensor measurements to determine the impact of the test signal. The operation of the magnetic torquer is then controlled using the evaluation of the sensor measurements.

In accordance with yet another aspect of the present invention, a method for use in connection with controlling the attitude of a spacecraft is provided. The method steps include applying a test signal to a magnetic torquer, generating sensor signals containing information about at least one spacecraft variable, and evaluating the sensor signals to determine the impact of the test signal. Thereafter, the operation of the magnetic torquer is controlled using the evaluation of the sensor signals.

DESCRIPTION OF THE PREFERRED EMBODIMENT

The present invention may be embodied in a method and apparatus that energizes a magnetic torquer coil or set of magnetic torquer coils and then monitors the spacecraft's response to the torque created by the coil's magnetic field. The goal is to use the magnetic torquers to generate a torque that opposes the torque created by the reaction wheel so as to slow the reaction wheel speed. The torque created by the energized coil is dependent on the polarity of the power source used to energize the coil and the direction of the earth's magnetic field with respect to the spacecraft. Thus, the direction of the earth's magnetic field must be determined so that the proper polarity may be applied to the coil to achieve the desired torque. The present invention energizes the coil with an initial polarity and observes the effect of the resulting torque by measuring the spacecraft's movement. The movement is then used to determine the direction of the earth's magnetic field. Once the direction of the earth's magnetic field is known, the proper polarity may be applied to the coils to effect the desired torque.

The effect of the torque created by the magnetic torquers is observed using the sensors that are already present on the spacecraft/satellite, and a small dither signal superimposed on the control current used to energize the coil. For example, the angular velocity of the spacecraft will change in response to the energized magnetic coil. This velocity is estimated from attitude sensor signals and then fed into a control processor. Then the angular velocity is synchronously demodulated using the dither signal to determine the direction of the earth's magnetic field with respect to the spacecraft. Thus, the earth's magnetic field, once learned, may be used to control the polarity of the power source that energizes the coil to effect the desired torque. As a result wheel desaturation may be achieved without the need for complex and weight-intensive magnetic field measuring and estimating equipment. In addition, any observables normally available within the spacecraft control system may be used to effect the desired torque.

Alternatively, a simplified version of the control system may be implemented wherein the speed of the reaction wheels is used as the observable spacecraft variable. The torque created by the magnetic torquers either causes an increase or decrease in wheel speed. An increase in wheel speed requires altering the polarity of the power supplied to the magnetic torquers, whereas a decrease in wheel speed requires maintaining the polarity of the power supplied to the magnetic torquers.

Figure 1:
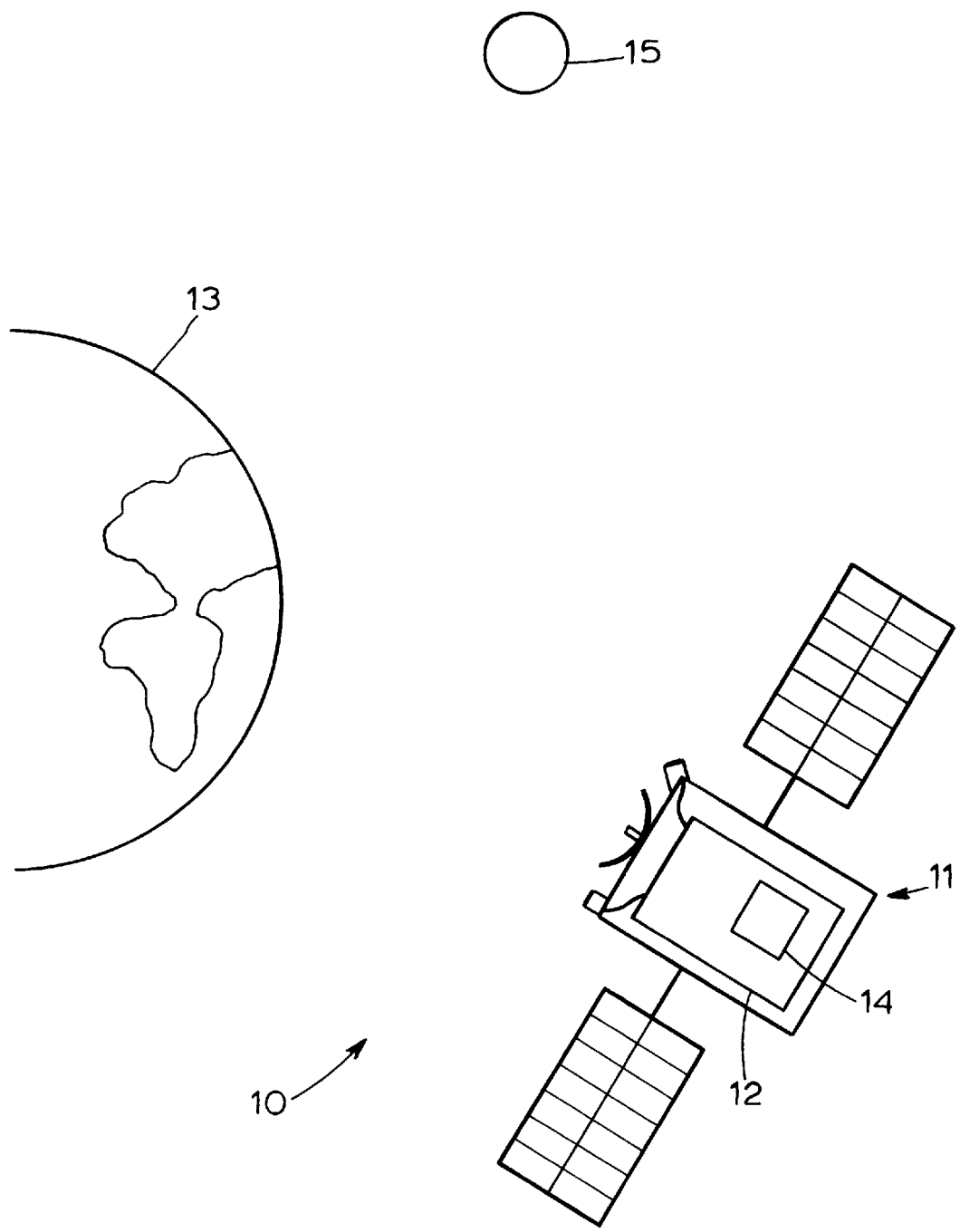
FIG. 1 is an illustration of a satellite system in which the attitude control system of the present invention may be implemented.

Referring now to FIG. 1, a satellite system 10 in which the present invention may be implemented is shown. The satellite system 10 includes a satellite 11 having an attitude control system 12 that is controlled via an attitude control processor 14. The satellite 11 orbits the earth 13. The satellite's position is generally defined with respect to the earth 13 and the sun 15.

Figure 2:
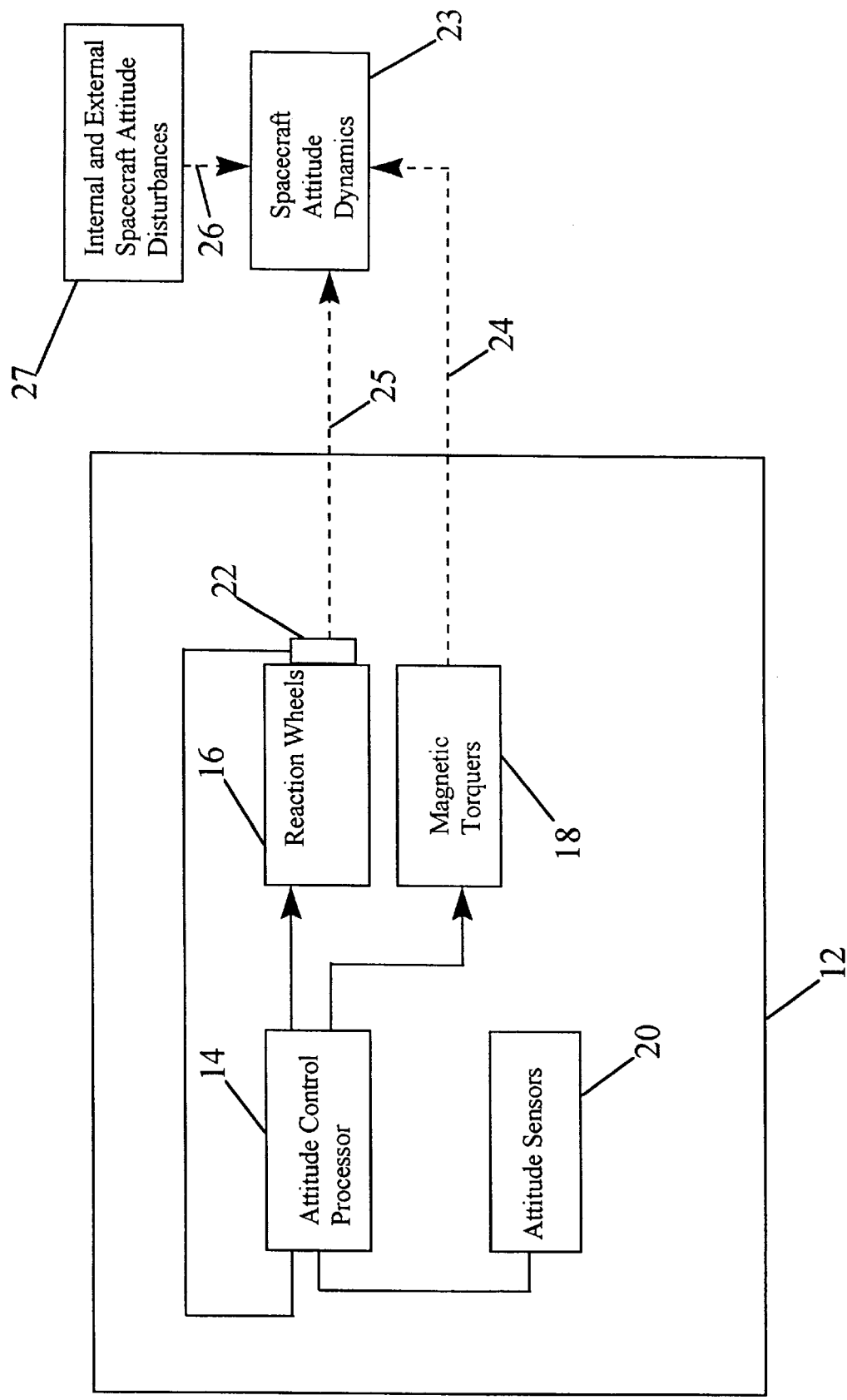
FIG. 2 is a block diagram of the attitude control system shown in FIG. 1 and embodying the present invention.

FIG. 2 provides a more detailed representation of the attitude control system 1. Four or more reaction wheels 16 provide the primary source of attitudinal movement whereas two or more magnetic torquers 18 arranged in non-redundant directions enable fine tuning of the attitudinal position. To aid in control of the reaction wheels 16 and magnetic torquers 18, a full complement of attitude sensors 20 including, for example, earth sensors, sun sensors, gyros for inertia sensing and/or star trackers supply signals to the attitude control processor 14. Wheel speed sensors 22 disposed within the reaction wheels 16 and integrated into electronic commutation equipment used to drive the wheels provide a tachometer pulse to the attitude control processor 14 that indicates the wheel speed. In response to the attitude sensor signals and the speed sensor signals, the control processor 14 drives the reaction wheels 16 and magnetic torquers 18 to effect a desired attitude. As shown by block 23 and dashed lines 24, 25 and 26, the combined action of the magnetic torquers 18, the reaction wheels 16 and any spacecraft attitude disturbances 27 all affect the spacecraft attitude dynamics thereby causing attitudinal movement of the craft. The attitude control processor 14 represents a particular embodiment of a control device that can be used in connection with present invention and although for illustration purposes the attitude control processor 14 is shown as a single processor, the attitude control equipment may instead be implemented using any number of configurations of computer systems and/or hardware circuitry. In addition, equipment including, for example, extra magnetic torquers and reaction wheels are typically present to provide system redundancy.

Figure 3:
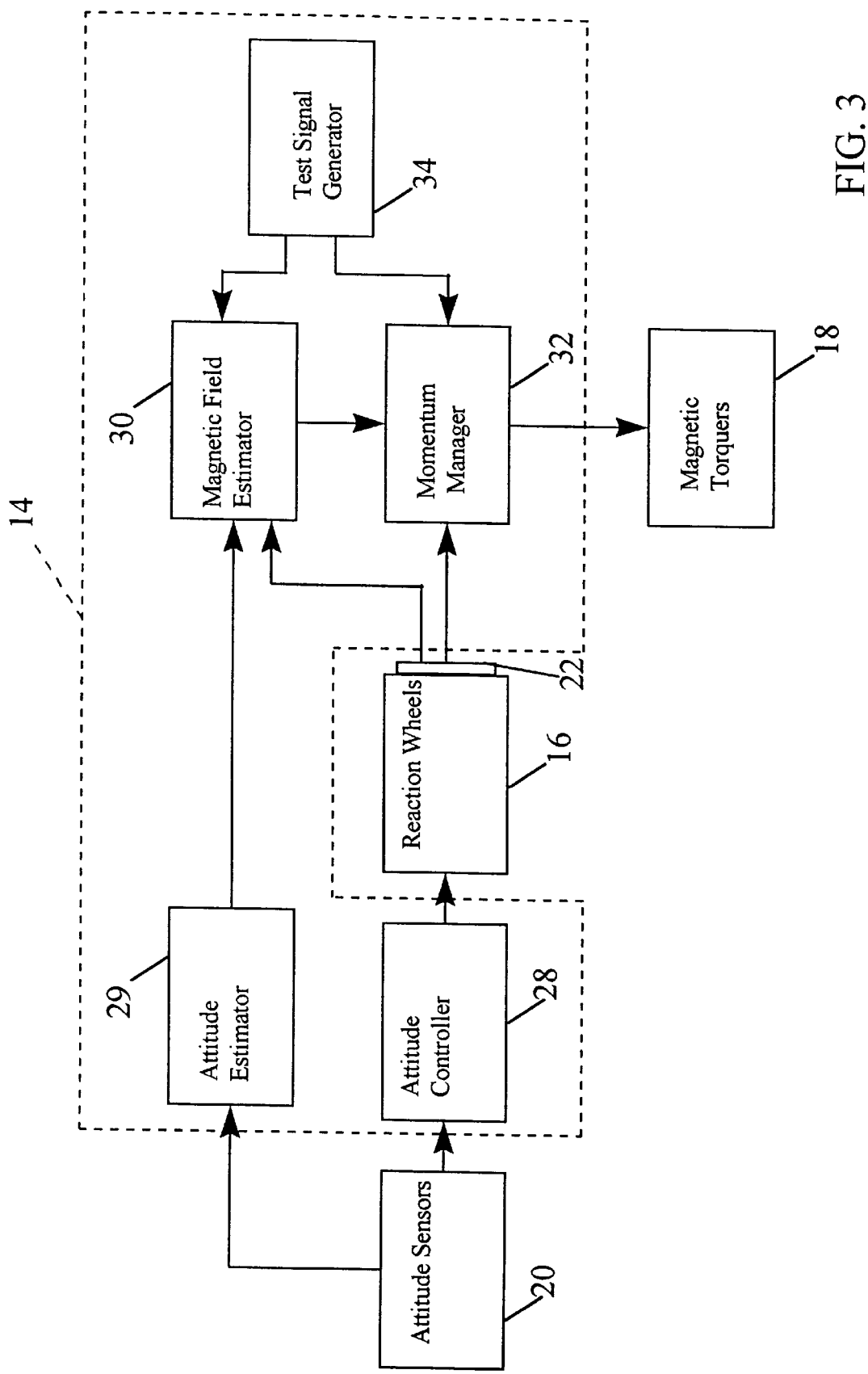
FIG. 3 is a block diagram showing further detail of the attitude control loop shown in FIG. 2.

FIG. 3 is a block diagram of the control processor 14 having an attitude control loop embodying certain aspects of the present invention. In general, the control processors 14 control an attitude controller 28, an attitude estimator 29, a magnetic field estimator 30, a test signal generator 34 and a momentum manager 32, connected together as shown. It is the control loop that issues an initial test current that activates the magnetic torquer, imposes the dither signal on the currents driving the magnetic torquers 18, observes the spacecraft's positional response to the dither signal, and adjusts the torquer driving currents in accordance with the present invention. In operation, the attitude sensors 20 provide signals to the attitude controller 28. In response, the attitude controller 28 processes the attitude signals and issues a control signal to cause acceleration or deceleration of the reaction wheels 16. In addition, the attitude sensors, implemented with gyros, sense the inertial movement of the craft and supply the inertia data signals to the attitude estimator 29. The attitude estimator 29 uses the signals to estimate the angular velocity of the craft, $\dot{\theta}_B$, which is then supplied to the magnetic field estimator 30. Wheel speed sensors 22 provide the measured wheel speed to the magnetic field estimator 30 and the momentum manager 32. As shown, the magnetic field estimator 30 also receives input from the test signal generator 34. The magnetic field estimator 30 processes the angular velocity supplied by the attitude estimator 29 and the test signal generator signals to generate an estimate of the earth's magnetic field. The momentum manager 32 receives the estimate from the magnetic field estimator 30, in addition to signals received from the test signal generator 34 and the wheel speed sensors 22. The received signals are thereafter processed by the momentum manager to generate an activation signal for controlling the magnetic torquers 18.

Figure 4:
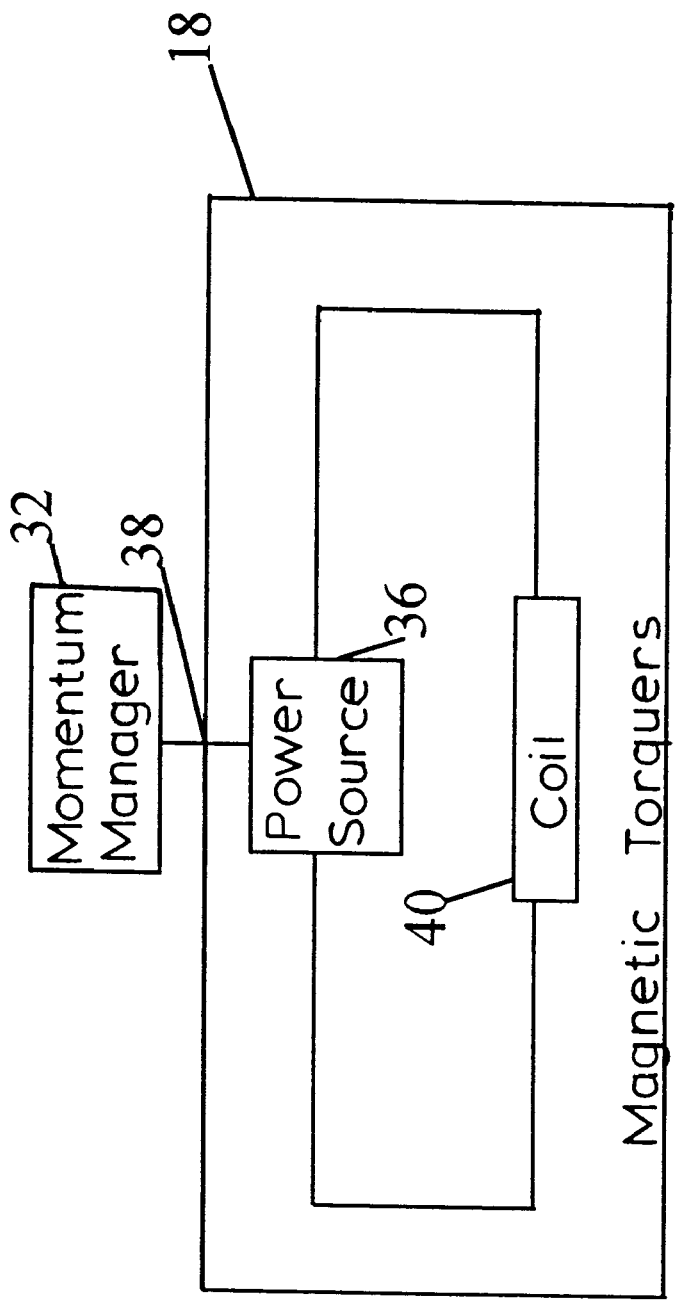
FIG. 4 is a circuit diagram of the magnetic torquers shown in FIGS. 2 and 3.

FIG. 4 is a simplified circuit diagram of one of the magnetic torquers 18. The power source 36 is implemented with a saturating amplifier that is controlled by the momentum manager 32 via control line 38. A reversal in the polarity of the power supplied by power source 36 causes a reversal in the current flow through a coil 40.

Referring now to FIGS. 3 and 4, in order to effect magnetic torquer control, the test signal generator 34 supplies a small dither signal to the momentum manager 32. The momentum manager 32 superimposes the dither signal on the main current provided by the saturating amplifier of power source 36. Thus, the total current i driving the magnetic torquers is given by the following expression:

$$i = i_b + i_0 \sin(\omega_0 t - \phi) \qquad (1)$$

where

- $i_b$ is the main current component that is provided by the saturating amplifier,
- $i_0$ is the baseband component of the dither signal, and
- $i_0 \sin(\omega_0 t - \phi)$ is the composite dither signal having a frequency of $\omega_0$ and a phase angle of $\phi$. (Note that in alternate embodiments, the dither signal may have any selected pattern such as a sinusoidal waveshape, or a train of periodic pulses.)

The current flow, i, through coil 40 induces a magnetic field, $\vec{H}$, having a direction that is perpendicular to the direction of the current flow. The induced magnetic field, $\vec{H}$, seeks to align itself with the earth's magnetic field, $\vec{B}$, causing a torque $\vec{\tau}_m$ to act upon the body of the craft. The resulting torque, $\vec{\tau}_m$, is represented by the expression:

$$\vec{\tau}_m = \vec{K}_m \cdot i, \qquad (2)$$

where $\vec{K}_m$ is the effective motor constant of the magnetic torquers.

The mathematical relationship between the magnetic fields $\vec{B}$ and $\vec{H}$, and the effective motor constant, $\vec{K}_m$, is revealed via the following equation:

$$\vec{K}_m = \chi_m n A (\vec{a}_H \times \vec{a}_B) \|\vec{B}\| \qquad (3)$$

where

- $\chi_m$ is the permitivity constant of the magnetic torquer,
- n is the number of turns in the solenoid coil of the magnetic torquer,
- A is the cross sectional area of the coil turns,
- $\vec{a}_H$ is a unit vector representing the direction of the induced magnetic field, $\vec{H}$,
- $\vec{a}_B$ is a unit vector representing the direction of the earth's magnetic field, $\vec{B}$, and
- $\|\vec{B}\|$ is the magnitude of the earth's magnetic field.

Note that since $\chi_m$, n and A are known quantities provided by the vendor of the magnetic torquer and since the direction of the induced magnetic field, $\vec{a}_H$ is also known, the earth's magnetic field, $\vec{B}$, is the only unknown contributor to $\vec{K}_m$. Thus, determining $\vec{K}_m$ enables determination of $\vec{B}$.

Figure 5:
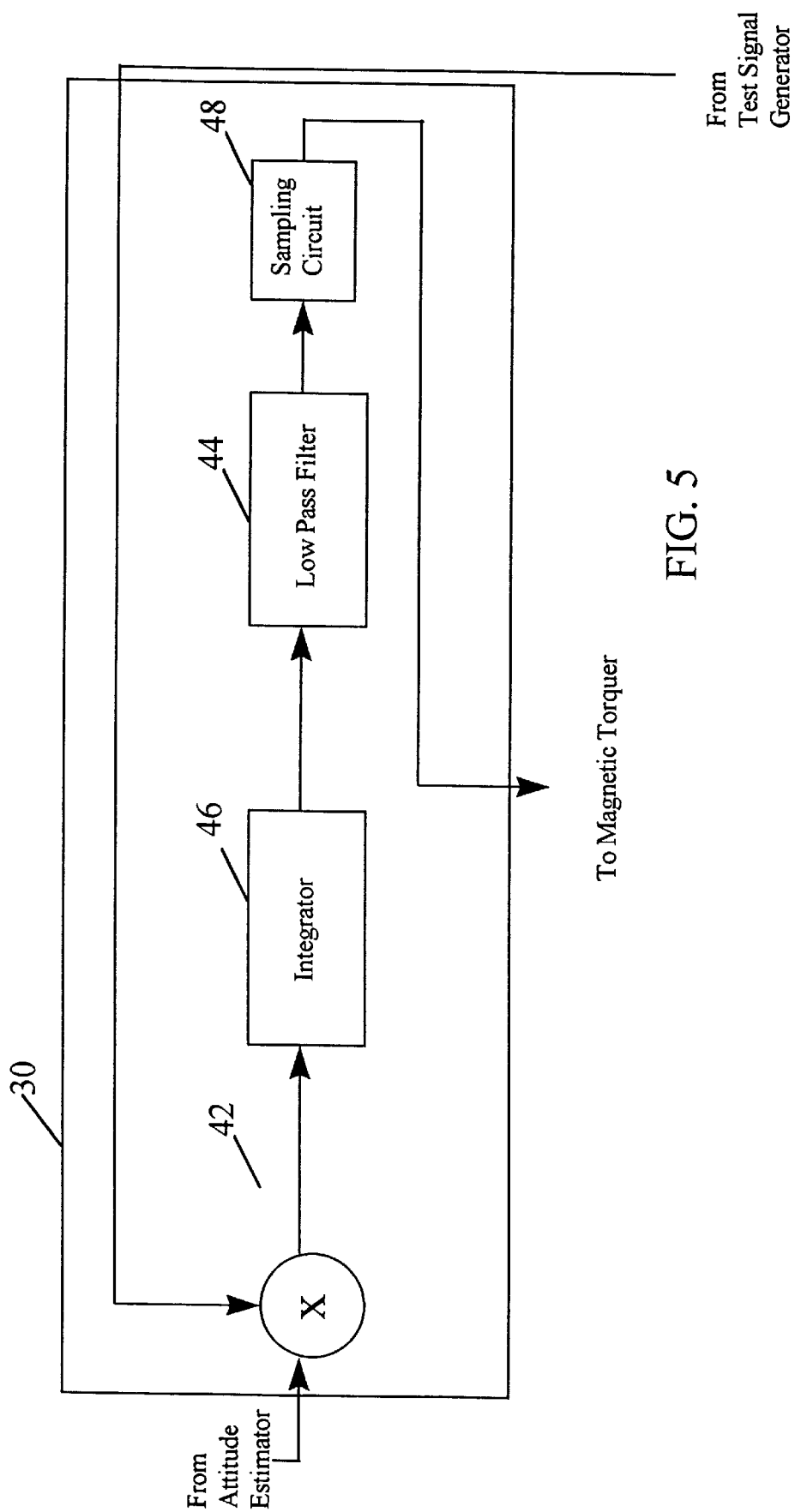
FIG. 5 is a block diagram of the momentum manager shown in FIG. 3 and FIG. 4.

FIG. 5 is a block diagram of the magnetic field estimator 30 which processes the angular velocity of the craft $\dot{\theta}_B(t)$ supplied by the attitude estimator 29 and the dither signal, $i_0 \sin(\omega_0 t - \phi)$, supplied by the test signal generator 34 to determine $\vec{K}_m$. To illustrate the relationship between the angular velocity of the spacecraft, $\dot{\theta}_B$, and the effective motor constant of the magnetic torquers, $\vec{K}_m$ using Newton's law, the sum total of torques acting on the spacecraft are related to the inertial mass of the spacecraft, $I_B$, and the angular acceleration of the spacecraft, $\ddot{\theta}_B$, as follows:

$$I_B \ddot{\theta}_B = \vec{\tau}_w + \vec{\tau}_m + \vec{\tau}_{d_e} + \vec{\tau}_{d_i} \qquad (4)$$

where

- $\vec{\tau}_w$ is the torque due to the reaction wheel,
- $\vec{\tau}_m$ is the torque due to the magnetic torquers,
- $\vec{\tau}_{d_e}$ is the torque due to external disturbances, and
- $\vec{\tau}_{d_i}$ is the torque due to internal disturbances.

For simplicity, assume that $\vec{\tau}_w$ and $\vec{\tau}_{d_i}$ are zero, so that $$I_B \ddot{\theta}_B = \vec{\tau}_m + \vec{\tau}_{d_e} \qquad (5)$$

Solving for the angular acceleration of the craft, $\ddot{\theta}_B$, and substituting $\vec{K}_m i$ for $\vec{\tau}_m$ yields, $$\ddot{\theta}_B = \vec{K}_m i + \frac{\vec{\tau}_{d_e}}{I_B}. \qquad (6)$$

Next, substituting $i_b + i_0 \sin(\omega_0 t - \phi)$ for i and expressing $\ddot{\theta}_B$ as a function of time results in the following:

$$\ddot{\theta}_B(t) = \frac{(\vec{K}_m i_B)}{I_B} + \left(\frac{\vec{K}_m i_0}{I_B}\right) \sin(\omega_0 t - \phi) + \frac{\vec{\tau}_{d_e}}{I_B} \qquad (7)$$

Lastly, integrating Eq. 9 from $t_0$ to t provides the angular velocity, $\dot{\theta}_B$ in terms of the effective motor constant, $\vec{K}_m$ and the current as follows:

$$\dot{\theta}_B(t) - \dot{\theta}_B(t_0) = \qquad (8)$$

$$\int_{t_0}^{t} \left(\frac{K_m i_B + \tau_{d_e}}{I_B}\right) dt - \frac{K_m i_0}{I_B} \cos(\omega_0 t - \phi) + \frac{K_m i_0}{\omega_0} \cos(\omega_0 t_0 - \phi).$$

For simplicity, $\tau_{d_e}$ is assumed to be slowly varying and thus relatively constant so that the first term of the right hand side of Eq. 9 is treated as a constant, yielding:

$$\dot{\theta}_B(t) - \dot{\theta}_B(t_0) = \qquad (9)$$

$$\frac{K_m i_B + \tau_{d_e}}{I_B} (t - t_0) - \frac{K_m i_0}{I_B \omega_0} \cos(\omega_0 t - \phi) + \frac{K_m i_0}{I_B \omega_0} \cos(\omega_0 t_0 - \phi).$$

Referring still to FIG. 5, the attitude estimator 29 supplies the angular velocity $\dot{\theta}_B$ to the magnetic field estimator 30. The magnetic field estimator 30 uses a synchronous demodulator represented by a mixer 42 and a low pass filter 44 in conjunction with a matched filter represented by an integrator 46 to obtain a scaled version of the baseband dither signal, $i_0$. Lastly, a sampler circuit 48 samples the output signal over an interval represented by T. Mathematically, this sequence of operations is given by:

$$LPF\left[\int_T \dot{\theta}_B(t) \cos(\omega_0 t - \phi) dt\right] = -\frac{K_m i_0}{2 I_B \omega_0} T. \qquad (10)$$

As will be appreciated by those skilled in the art, the duration of the sampling interval T will affect the signal to noise ratio of the output signal and thus may be selected so as to obtain an output signal having a desired signal to noise ratio. The output of the magnetic field estimator 30 is then provided to the momentum manager where it is divided by the following constant:

$$\frac{-2I_B \omega_0}{i_0 T} \quad (11)$$

to $\vec{K}_m$. Once $\vec{K}_m$ has been determined, the momentum manager evaluates the sign of $\vec{K}m$ to determine whether coil 40 is energized such that a desired torque has been achieved. A positive value of $\vec{K}_m$ results in wheel desaturation and indicates that the proper polarity is applied to coil 40. Conversely a negative value of $\vec{K}_m$ results in an increase in wheel speed thereby requiring that the polarity applied to coil 40 be reversed.

In addition to evaluating the sign of $\vec{K}_m$, the momentum manager 32 also compares the magnitude to a threshold value $\vec{K}_{mth}$. Since the magnitude of $\vec{K}_m$ is a function of the cross product of the magnetic field vectors $\vec{a}_H$ and $\vec{a}_B$ as shown in Eq. 4, the magnitude of $\vec{K}_m$ is dependent upon the angle between the vectors as follows:

$$(\vec{a}_H \times \vec{a}_B) = \sin \theta_{HB} \quad (12)$$

where
$\theta_{HB}$ is the angle between the induced magnetic field and the earth's magnetic field.

Thus, when the position of the craft relative to the earth is such that $\theta_{HB}$ is 90 degrees, the torque achieved by energizing coil 40 obtains a maximum magnitude. In contrast, when the fields are nearly aligned so that $\theta_{HB}$ is very small, the torque achieved by energizing coil 40 obtains a minimum magnitude. To promote efficient fuel consumption, a threshold value, $K_{mth}$ is selected that corresponds to the minimum torque at which the momentum manager will continue to energize coil 40. Any value of $\vec{K}_m$ that is lower than the threshold value, $\vec{K}_{mth}$ will cause the momentum manager to deenergize coil 40 to conserve energy. Thus, the comparator enables efficient usage of the magnetic torquers. The value selected to represent $K_m$ may be provided by the energy management supervisor program (not shown) that controls energy consumption and expenditure on board the craft.

Alternately, rather than synchronously demodulating the selected observable, the attitude control system of the present invention can also be implemented using a trial and error approach in which the magnetic torquers 18 are energized and the resulting change in wheel speed is monitored using the signal supplied by the wheel speed sensors 22 to the momentum manager 32 (see FIG. 3). In response to a decrease in wheel speed, the momentum manager 32 will maintain the present polarity of the power source providing current flow in the coil 40. In contrast, the momentum manager will reverse the polarity of the power supplied to the magnetic torquer coil 40 in response to an increase in wheel speed. Though not as sophisticated as the synchronously demodulated control method, this alternate implementation requires less processing power and thus a less complex design.

Although the present invention is described in terms of a single dimension, those skilled in the art will appreciate that three dimensional control may be effected through the use of two or more magnetic torquers. For the three dimensional implementation, independent dither signals should be used for each torquer channel. The effectiveness of each torquer in desaturating each wheel can thus be determined and used to define desaturation logic for each wheel.

Figure 6:
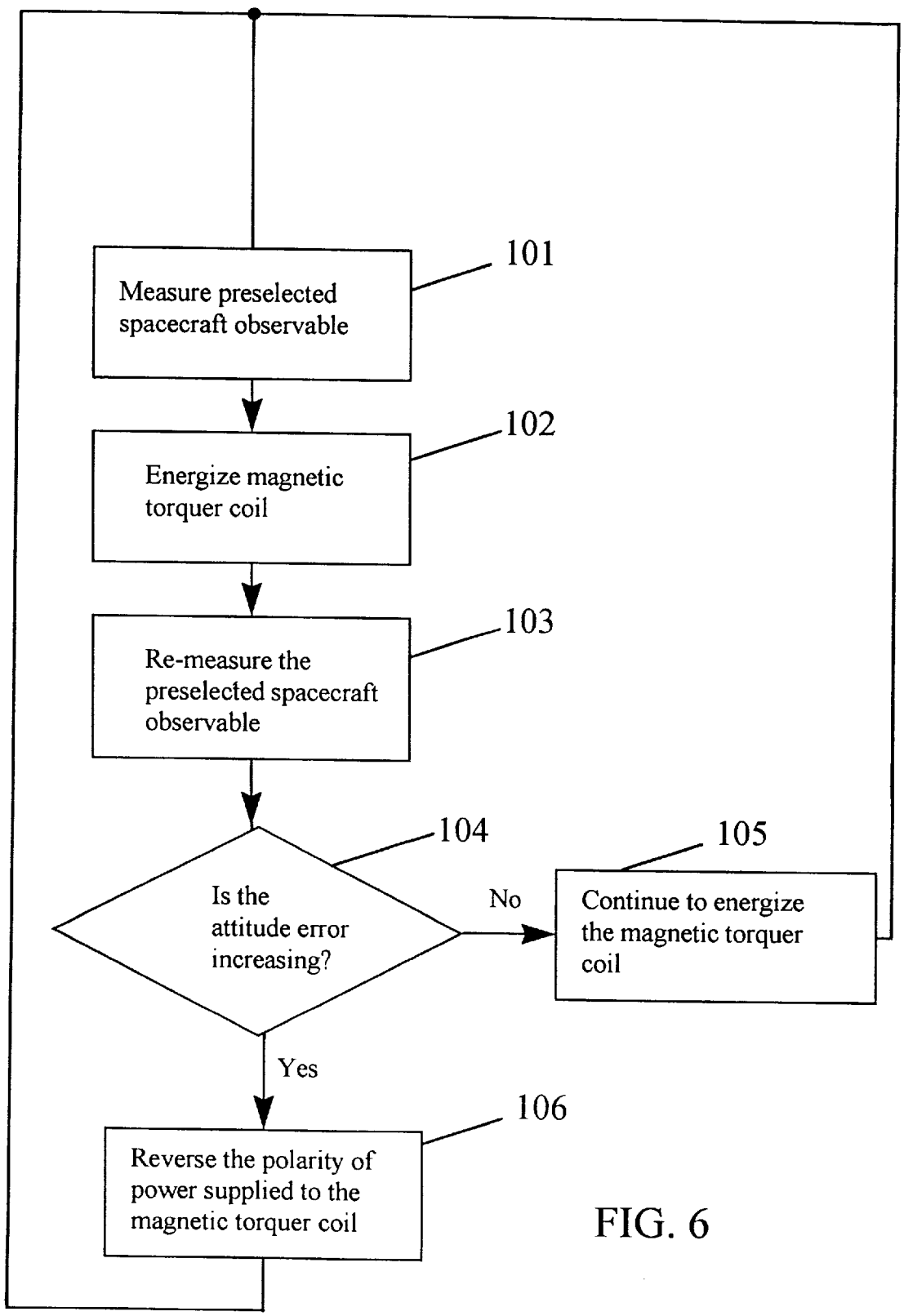
FIG. 6 is a flow chart showing the method of the present invention.

FIG. 6 is a flow diagram illustrating the method of the present invention. Beginning at block 101 a preselected spacecraft observable is monitored. Next, control passes to a block 102 where the magnetic torquer coil is energized. At block 103, the preselected spacecraft observable is again measured. Then, at block 104, the observable value measured at block 103 is compared to that measured at block 101. If the observable indicates attitude error is decreasing, then the power source continues to energize the magnetic torquer coil at block 105. If, instead, the comparison of the measured observable indicates that the attitude error is increasing, then control passes to block 106 where the polarity of the power source energizing the coil is reversed so that the torquer produces an opposing torque. Note that determining whether attitude error is increasing or decreasing may be as simple as subtracting the value measured at block 101 from the value measured at block 103 or may instead require more complex processing such as synchronous demodulation. The amount of processing is dependent upon the observable selected and the amount of control desired. For example, precise control will typically require more processing than applications where less precise control is adequate. The process represented in FIG. 6 is continuously repeated in a loop fashion to effect magnetic torquer control.

Thus, the present invention achieves magnetic torquer control without the need for the weight intensive, complex and costly designs required to measure or estimate the earth's magnetic field using either magnetometers or magnetic field models. Moreover, the present invention utilizes observables that are supplied in conventional attitude control processing so that additional circuitry is not required for implementation.

Ideally, the functions represented in FIG. 5, and those performed by the modules residing within the attitude control processor 14 will be implemented by a stored program general purpose computer. However, it should be understood that a range of changes and modifications can be made to the preferred embodiment described above. For example, digital signal processors, or field programmable gate arrays configured to perform the operations discussed herein may also be used. In addition, other spacecraft observables, may be used instead of the angular velocity provided by the attitude estimator 29. For example, the commanded wheel torque, the attitude errors or any of the quantities normally available within the spacecraft control system flight software may be utilized to monitor the effect of the magnetic torquers on the spacecraft attitude.

It is therefore intended that the foregoing detailed description be regarded as illustrative rather than limiting and that it be understood that it is the following claims, including all equivalents, which are intended to define the scope of the invention.

What is claimed is:

1. An apparatus for use in connection with controlling the attitude of a spacecraft, the apparatus comprising:

at least one magnetic torquer that, when energized, creates a torque that acts upon the spacecraft;

at least one sensor that monitors at least one spacecraft variable and generates sensor signals containing information about said at least one spacecraft variable; and a control device that applies a test signal to said magnetic torquer, evaluates said sensor signals to determine an impact of said test signal, and controls the operation of said magnetic torquer based on said evaluation of said sensor signals;

whereby said test signal and evaluation of said sensor signals to determine an impact of said test signal is used to determine an estimate of the earth's magnetic field which is unknown prior to application of said test signal.

2. The apparatus of claim 1 wherein:

said at least one spacecraft variable comprises attitude; and said at least one sensor comprises an attitude sensor.

3. The apparatus of claim 1 wherein:

said at least one spacecraft variable comprises reaction wheel speed; and said at least one sensor comprises a wheel speed sensor.

4. The apparatus of claim 1 wherein said control of the operation of said magnetic torquer comprises said control device supplying activation signals that drive said magnetic torquer.

5. The apparatus of claim 4 wherein said test signal comprises a dither signal superimposed on said activation signals.

6. The apparatus of claim 1 wherein evaluation of said sensor signals to determine said impact of said test signal comprises:

using said sensor signals to generate an estimate of a second spacecraft variable;

using said estimate of said second variable and said test signal to generate an estimate of the earth's magnetic field;

using said estimate of the earth's magnetic field and said test signal to generate an activation signal capable of driving said magnetic torquer.

7. The apparatus of claim 6 wherein said control of said operation of said magnetic torquers comprises applying said activation signal to said magnetic torquer.

8. The apparatus of claim 7 wherein said application of said test signal to said magnetic torquer comprises superimposing a dither signal on said activation signal.

9. The apparatus of claim 6 wherein:

said at least one spacecraft variable comprises attitude; and said second spacecraft variable comprises an angular velocity of the spacecraft.

10. A spacecraft comprising:

attitude sensors that generate sensor measurements related to the attitude of the spacecraft;

reaction wheels that control the attitude of the spacecraft;

magnetic torquers that affect the speed of said reaction wheels;

a control device that applies a test signal to said magnetic torquers, at least some of said sensor measurements to determine an impact of said test signal, and controls the operation of said magnetic torquers based on said evaluation of said sensor measurements;

whereby said test signal and evaluation of said sensor measurements to determine an impact of said test signal is used to determine an estimate of the earth's magnetic field which is unknown prior to application of said test signal.

11. The spacecraft of claim 10 wherein said control of the operation of said magnetic torquers comprises said control device supplying activation signals that drive said magnetic torquers.

12. The spacecraft of claim 11 wherein:

said test signal comprises a dither signal; and said dither signal is superimposed on said activation signals.

13. The spacecraft of claim 10 wherein said evaluation of said at least some of said sensor measurements to determine said impact of said test signal comprises:

using said at least some of said sensor measurements to generate an estimate of a spacecraft variable;

using said estimate of said variable and said test signal to generate an estimate of the earth's magnetic field;

using said estimate of the earth's magnetic field and said test signal to generate an activation signal capable of driving said magnetic torquers.

14. The spacecraft of claim 13 wherein said control of said operation of said magnetic torquers comprises applying said activation signal to said magnetic torquers.

15. The spacecraft of claim 14 wherein said application of said test signal to said magnetic torquers comprises superimposing a dither signal on said activation signal.

16. The spacecraft of claim 15 wherein said spacecraft variable comprises an angular velocity of the spacecraft.

17. A method for use in connection with controlling the attitude of a spacecraft, the steps comprising:

applying a test signal to a magnetic torquer;

generating sensor signals containing information about at least one spacecraft variable;

evaluating said sensor signals to determine an impact of said test signal; and controlling the operation of said magnetic torquer based on said evaluation of said sensor signals;

whereby said test signal and evaluation of said sensor signals to determine an impact of said test signal is used to determine an estimate of the earth's magnetic field which is unknown prior to application of said test signal.

18. The method of claim 17 wherein said at least one spacecraft variable comprises attitude.

19. The method of claim 17 wherein said at least one spacecraft variable comprises reaction wheel speed.

20. The method of claim 17 wherein said step of controlling the operation of said magnetic torquer comprises supplying an activation signal that drives said magnetic torquer.

21. The method of claim 20 wherein:

said test signal comprises a dither signal; and said dither signal is superimposed on said activation signals.

22. The method of claim 17 wherein said step of evaluating said sensor signals to determine said impact of said test signal comprises:

using said sensor signals to generate and estimate of a second spacecraft variable;

using said estimate of said second variable and said test signal to generate an estimate of the earth's magnetic field;

using said estimate of the earth's magnetic field and said test signal to generate an activation signal capable of driving said magnetic torquer.

23. The method of claim 22 wherein said step of controlling said operation of said magnetic torquer comprises applying said activation signal to said magnetic torquer.

24. The method of claim 23 wherein said step of applying said test signal to said magnetic torquer comprises superimposing a dither signal on said activation signal.

25. The method of claim 22 wherein said second spacecraft variable comprises an angular velocity of the spacecraft.

* * * * *